US011526893B2

(12) United States Patent
Poole (10) Patent No.: US 11,526,893 B2
(45) Date of Patent: Dec. 13, 2022

(54) SYSTEM AND METHOD FOR PRICE MATCHING THROUGH RECEIPT CAPTURE

(71) Applicant: Capital One Services, LLC, McLean, VA (US)

(72) Inventor: Thomas S. Poole, Chantilly, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 1086 days.

(21) Appl. No.: 15/394,253

(22) Filed: Dec. 29, 2016

(65) Prior Publication Data

US 2018/0189786 A1 Jul. 5, 2018

(51) Int. Cl.
*G06Q 20/40* (2012.01)
*G06Q 20/00* (2012.01)
(Continued)

(52) U.S. Cl.
CPC ......... *G06Q 20/407* (2013.01); *G06Q 10/087* (2013.01); *G06Q 20/00* (2013.01);
(Continued)

(58) Field of Classification Search
CPC .... G06Q 20/407; G06Q 10/087; G06Q 20/00; G06Q 20/3276; G06Q 20/36;
(Continued)

(56) References Cited

U.S. PATENT DOCUMENTS 10,192,217 B1 * 1/2019 Ellis ..................... G06Q 20/322
10,366,385 B1 * 7/2019 Ramalingam ...... G06Q 20/3674
(Continued)

FOREIGN PATENT DOCUMENTS

WO WO-2005069871 A2 * 8/2005 ............. G06Q 30/00

OTHER PUBLICATIONS

K. G. Javkar, S. H. Vora, A. S. Rodge, J. Bose and H. Sharma, "Best offer recommendation service," 2016 International Conference on Advances in Computing, Communications and Informatics (ICACCI), 2016, pp. 2430-2436, doi: 10.1109/ICACCI.2016.7732421 (Year: 2016).*

*Primary Examiner* — Scott C Anderson
*Assistant Examiner* — James H Miller
(74) *Attorney, Agent, or Firm* — Troutman Pepper Hamilton Sanders LLP; Christopher J. Forstner; John A. Morrissett (57) ABSTRACT

A system and method for generating a notification of a price change for a transaction and facilitating an associated price adjustment based on electronic image capture of a paper receipt. An image capture system captures an electronic image of a paper transaction receipt, which is transmitted to a data extraction processor that extracts transaction receipt data from the captured electronic image. A unique key is generated by an authentication server that is matched to a transaction record to generate a reliability score for the OCRed image and to authorize price matching. If the price monitoring server identifies that the price of a purchased transaction item has changed, the price monitoring server automatically generates a notification to the user indicating the price change and an email to the customer service department of the merchant from which the transaction item was purchased, requesting a price adjustment that is credited back to the payment instrument.

23 Claims, 4 Drawing Sheets

(51) Int. Cl.
*G06Q 20/32* (2012.01)
*G06Q 20/36* (2012.01)
*G06Q 20/38* (2012.01)
*G06V 10/10* (2022.01)
*G06V 20/62* (2022.01)
*G06V 30/142* (2022.01)
*G06V 30/224* (2022.01)
*G06V 30/414* (2022.01)
*G06Q 10/08* (2012.01)
*G06V 30/10* (2022.01)

(52) U.S. Cl.
CPC ......... *G06Q 20/3276* (2013.01); *G06Q 20/36* (2013.01); *G06Q 20/385* (2013.01); *G06V 10/10* (2022.01); *G06V 20/63* (2022.01); *G06V 30/142* (2022.01); *G06V 30/224* (2022.01); *G06V 30/414* (2022.01); *G06V 30/10* (2022.01)

(58) Field of Classification Search
CPC .. G06Q 20/385; G06Q 30/02; G06K 9/00463; G06K 9/18; G06K 9/228; G06K 9/3258; G06K 9/78; G06K 2209/01; G06V 10/10; G06V 20/63; G06V 30/142; G06V 30/224; G06V 30/414; G06V 30/10
See application file for complete search history.

(56) References Cited

U.S. PATENT DOCUMENTS

| | | | |
|---|---|---|---|
| 10,387,906 B1* | 8/2019 | Sharma | G06Q 20/24 |
| 2010/0208976 A2* | 8/2010 | Abernethy | G07F 7/122 |
| | | | 382/139 |
| 2012/0253985 A1* | 10/2012 | Maron | G06Q 10/0633 |
| | | | 705/27.1 |
| 2012/0290449 A1* | 11/2012 | Mullen | G06Q 10/00 |
| | | | 705/27.2 |
| 2012/0303430 A1* | 11/2012 | Tiku | G06Q 30/0207 |
| | | | 705/14.17 |
| 2013/0346327 A1* | 12/2013 | Lassley | G06Q 30/018 |
| | | | 705/317 |
| 2014/0207620 A1* | 7/2014 | Nickerson | G06Q 30/0623 |
| | | | 705/26.61 |
| 2014/0278902 A1* | 9/2014 | Hatch | G06Q 30/0234 |
| | | | 705/14.34 |
| 2014/0304059 A1* | 10/2014 | Wang | G06Q 30/0234 |
| | | | 705/14.34 |
| 2014/0330644 A1* | 11/2014 | Burrell | G06Q 30/0255 |
| | | | 705/14.53 |
| 2015/0046240 A1* | 2/2015 | Moreton | G06Q 30/0225 |
| | | | 705/14.17 |
| 2015/0051955 A1* | 2/2015 | Kumar | G06Q 30/0206 |
| | | | 705/7.35 |
| 2017/0213271 A1* | 7/2017 | Nelms | G06Q 30/0629 |

* cited by examiner

SYSTEM AND METHOD FOR PRICE MATCHING THROUGH RECEIPT CAPTURE

FIELD OF THE DISCLOSURE

The present disclosure relates to systems and methods for generating a notification of a price change for a transaction and facilitating an associated price adjustment based on electronic image capture of a paper receipt for the transaction, utilizing a unique key that is generated to verify the transaction.

BACKGROUND OF THE DISCLOSURE

Currently, it is extremely difficult for customers to seamlessly learn when the price for something which they have purchased has been reduced, either by the merchant where the item was originally purchased or at a different merchant, such that a savings resultant from a price guarantee can be obtained. Furthermore, in response to learning that the price on something they have bought has been reduced, customers typically must undergo the inconvenience of manually having to contact or visit the selling merchant to request the refund, including bringing proof of where the lower price was offered to justify to the merchant that the price should be reduced. Where some limitation of the price guarantee, or defect in the available proof, precludes the merchant from applying the price guarantee, the purchaser will likely believe that they have wasted their time, reducing the likelihood that they will seek refunds under price guarantees in the future, costing the consumer their hard earned resources. For some purchases for which a user has an email receipt, a price tracker application may be utilized to tell customers when the price on something they purchased has changed. However, customers are not provided with such notifications for those purchases where an email receipt is not available.

When a customer requests a price match, there is also a need for verification that a customer requesting to receive a credit for the associated price adjustment actually purchased the item for which the customer is requesting the price adjustment. Additionally, after a customer has received a price adjustment, if the merchant does not keep track of the specific price adjustment, the customer may attempt to return the price adjusted item and receive a credit for the original price, not the price adjusted price.

These and other drawbacks exist.

SUMMARY OF THE DISCLOSURE

Various embodiments of the present disclosure provide systems and methods for generating a notification of a price change for a transaction and facilitating an associated price adjustment based on electronic image capture of a paper receipt for the transaction. A price matching system may include a client device, a merchant system, a data extraction processor and an account provider system.

An image capture system on a client device may be utilized to capture an electronic image of a paper transaction receipt, which may be transmitted to a data extraction processor, which may include an optical character recognition (OCR) device. The data extraction processor may extract transaction receipt data from the captured electronic image.

Upon extracting enhanced transaction information from the transaction receipt, a unique key may be generated by an authentication server. For example, the enhanced transaction information may include the timestamp of the transaction. This unique key may be matched to a stored transaction record, and as such, may be utilized to generate a reliability score for the OCRed image. If the unique key is matched to the transaction record, the system may authorize price matching.

A price monitoring server may utilize a web crawler as an item level price tracker to facilitate price matching by searching for a price change of an item identified on a user's transaction receipt through the electronic data extraction. The price change may include a reduction in price, and/or an application of a coupon, credit, or rebate. If the price monitoring server identifies that the price of a previously purchased transaction item has changed, a price adjustment server may automatically generate and transmit a notification to the user indicating the price change. The price adjustment server may also automatically generate and transmit an email to the customer service department of the merchant from which the transaction item was purchased, requesting a price adjustment that is credited back to the payment instrument used in making the transaction.

In an example embodiment, a client device may include a mobile device that may utilize location-tracking systems and methods, such as geo-fencing technologies, to determine the current location of the customer mobile device. A price monitoring server 156 may be utilized to determine whether the location of the customer mobile device matches a merchant location for which price matching has been identified. If a match is identified, the current location of the customer mobile device may be transmitted to the price adjustment server, which may, in real time, transmit a notification to the customer mobile device indicating that the customer has a price matched credit at the current merchant location.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving generating a notification of a price change for a transaction and facilitating an associated price adjustment based on electronic image capture of a paper receipt for the transaction. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A point-of-sale (PoS) terminal and payment gateway, and client device are used as examples for the disclosure. The disclosure is not intended to be limited to paper receipts, image capture systems, data extraction processors, and client devices only. For example, many other electronic devices may utilize a system to generate a notification of a price change for a transaction and facilitate an associated price adjustment based on not only the electronic image capture of other paper documents but also the capture of electronic documents and online interfaces for the transaction.

Figure 1:
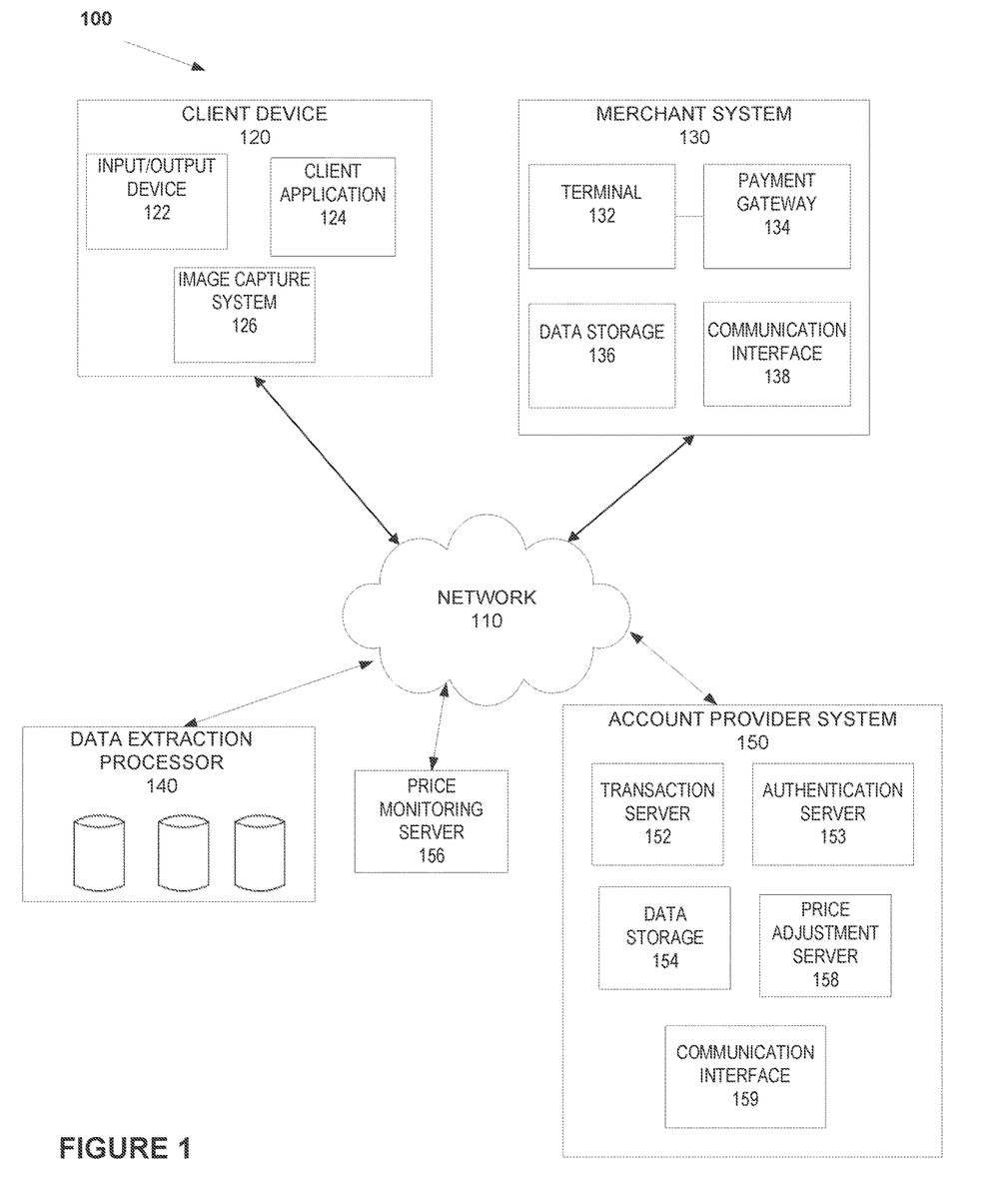
FIG. 1 depicts an example system for generating a notification of a price change for a transaction and facilitating an associated price adjustment based on electronic image capture of a paper receipt for the transaction, according to embodiments of the disclosure.

FIG. 1 depicts an example system 100 for generating a notification of a price change for a transaction and facilitating an associated price adjustment based on electronic image capture of a paper receipt for the transaction. As shown in FIG. 1, an example system 100 may include one or more client devices 120, one or more merchant systems 130, one or more account provider's systems 150, and one or more data extraction processors 140 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth™ network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Client device 120 and/or merchant system 130 may be, for example, a mobile device, such as, for example, personal digital assistants (PDA), tablet computers and/or electronic readers (e.g., iPad™, Kindle Fire™, Playbook™, Touchpad™, etc.), wearable devices (e.g., Google Glass™), telephony devices, smartphones, cameras, music playing devices (e.g., iPod™, etc.), televisions, set-top-box devices, and the like.

Account provider system 150, client device 120, merchant system 130, and/or data extraction processor 140 may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, account provider system may include components such as those illustrated in FIG. 3. Merchant system may include, for example, components illustrated in FIG. 2.

Account provider system 150, client device 120, merchant system 130, and/or data extraction processor 140 may include at least one central processing unit (CPU), which may be configured to execute computer program instructions to perform various processes and methods. Account provider system 150, client device 120, and/or data extraction processor 140 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel™ file, Microsoft® Access™ file, a solid state storage device, which may include an all flash array, a hybrid array, or a server-side product, enterprise storage, which may include online or cloud storage, or any other storage mechanism.

Account provider system 150, client device 120, merchant system 130, and/or data extraction processor 140 may further include, for example, a processor, which may be several processors, a single processor, or a single device having multiple processors. Although depicted as single elements, it should be appreciated that according to one or more embodiments, account provider system 150, client device 120, merchant system 130, and/or data extraction processor 140 may comprise a plurality of account provider systems 150, client devices 120, merchant systems 130, and/or data extraction processors.

As shown in FIG. 1, each account provider system 150, client device 120, merchant system 130, and/or data extraction processor 140 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, system 100 may include client device 120, which may be any device capable of communicating via, for example, Bluetooth™ technology, NFC technology, WiFi Direct technology, and/or the like and execute various functions to transmit and receive account data (e.g., card number, account type, account balance, account limits, budget data, recent transactions, and/or the like). For example, client device 120 could be an iPhone™, iPod™, iPad™, and/or Apple Watch™ from Apple® or any other mobile device running Apple's iOS™ operating system, any device running Google's Android® operating system, including, for example, smartphones running the Android® operating system and other wearable mobile devices, such as Google Glass™ or Samsung Galaxy Gear Smartwatch™, any device running Microsoft's Windows® Mobile operating system, and/or any other smartphone or like device.

Client device 120 may include for example, an input/output device 122, a client application 124, and an image capture system 126. Input/output device 122 may include, for example, a Bluetooth™ device or chipset with a Bluetooth™ transceiver, a chip, and an antenna. The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like. The device control functionality and other Bluetooth™-related functionality may be supported using a Bluetooth™ API provided by the platform associated with the client device 120 (e.g., The Android™ platform, the iOS™ platform). Using a Bluetooth™ API, an application stored on a client device 120 (e.g., a banking application, a financial account application, price matching application etc.) or the device may be able to scan for other Bluetooth™ devices, query the local Bluetooth™ adapter for paired Bluetooth™ devices, establish RFCOMM channels, connect to other devices through service discovery, transfer data to and from other devices, and manage multiple connections. A Bluetooth™ API used in the methods, systems, and devices described herein may include an API for Bluetooth Low Energy™ (BLE) to provide significantly lower power consumption and allow a mobile device 120 to communicate with BLE devices that have low power requirements.

Input/output device 122 may include for example, I/O devices, which may be configured to provide input and/or output to mobile device 120 (e.g., keyboard, mouse, display, speakers, printers, modems, network cards, etc.). Input/output device 122 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of client device 120, and a bus that allows communication among the various components of client device 120. Input/output device 122 may include a display, which may include for example output devices, such as a printer, display screen (e.g., monitor, television, and the like), speakers, projector, and the like. Although not shown, each client device 120 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output device 122 may also include an NFC antenna and secure element (SE). The SE may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Input/output device 122 may enable Industry Standard NFC Payment Transmission. For example, the input/output device 122 may enable two loop antennas to form an air-core transformer when placed near one another by using magnetic induction. Input/output device 122 may operate at 13.56 MHz or any other acceptable frequency. Also, input/output device 122 may provide for a passive communication mode, where the initiator device provides a carrier field, permitting answers by the target device via modulation of existing fields. Additionally, input/output device 122 also may provide for an active communication mode by allowing alternate field generation by the initiator and target devices.

Input/output device 122 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output device 122 may be capable of utilizing standardized transmission protocols, for example but not by way of limitation, ISO/IEC 14443 A/B, ISO/IEC 18092, MiFare, FeliCa, tag/smartcard emulation, and the like. Also, input/output device 122 may be able to utilize transmission protocols and methods that are developed in the future using other frequencies or modes of transmission. Input/output device 122 may also be backwards-compatible with existing techniques, for example RFID. Also, the system may support transmission requirements to meet new and evolving standards including internet based transmission triggered by NFC.

The current location of client device 120 may be determined using many different technologies such as GPS technology, Internet-based technology, etc., which may utilize location data. By way of example, location data may include, but is not limited to GPS data, assisted GPS data, IP address data, cell ID data, received signal strength indication (RSSI) data, wireless fingerprinting data, inertial sensor data (e.g., compass or magnetometer data, accelerometer data, and/or gyroscope data), barometer data, ultrasonic data (e.g., radio-frequency identification (RFID) data, near-field communication (NFC) data), Bluetooth™ data, and/or terrestrial transmitter data.

Client device 120 may also include various software components to facilitate the account, payment, and transaction operations including an App Processor. For example, client device 120 may include an operating system such as, for example, the iOS™ operating system from Apple, the Google Android™ operating system, and the Windows Mobile™ operating system from Microsoft. Client device 120 may also include, without limitation, software applications such as mobile banking applications and financial institution applications to facilitate ordering and payment, an NFC application programming interface, and software to enable touch sensitive displays. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth™ API supporting BLE, and a real-time data (RTD) API and a NFC Data Exchange Format (NDEF) API for reading/writing.

The App Processor may enable execution of software applications on client device 120. In various embodiments, the App Processor may cooperate with the NFC technology to enable a payment using client device 120. Additionally, client device 120 may include an attachment for contactless payments (not shown), such as a contactless payment attachment that plugs into an audio jack or plug of a mobile device.

The App Processor may enable execution of a mobile wallet application, which may include various user interfaces, which may leverage transaction data, wireless data connection, over-the-air data connection, or other means of data transmission. The data used in the application may be transmitted, for example, from external data sources. For example, the application and user interface may leverage information about products and/or services being purchased, information about the account or account holder, information about the merchant and/or other parties involved in a transaction, rewards information, promotional information, advertising information, and other useful information.

Software applications on client device 120 may include, for example, client application 124, which may be integrated with or separate from a mobile wallet application, which may be utilized to generate a notification of a price change for a transaction and to facilitate an associated price adjustment based on electronic image capture of a paper receipt for the transaction.

Image capture system 126 may include a camera that may be utilized to capture a picture of a paper document, such as a paper receipt. Image capture system 126 may also include a scanner that may be utilized to capture a picture of a paper document.

Client device 120 may transmit the electronic image of the captured picture to data extraction processor 140 via network 110. Content from the paper document may be extracted by the data extraction processor 140, which may include an OCR device that may convert images of text into characters. Specifically, data extraction processor 140 may enhance extract transaction receipt data from a paper receipt, which may include identifying store keeping unit (SKU) level inventory information. The specific extracted transaction information may also include specific details of the individual transaction items. The extracted data may be stored on data storage on data extraction processor 140. Data extraction processor 140 may transmit the enhanced customer transaction data to authentication server 153. Data extraction processor HO may be an external system to client device 120 or data extraction processor may be located on client device 120 or on account provider system 150.

The paper document may be OCRed through an automated, a manual, or a hybrid of the automated and manual process. An OCR device may include a comparison unit which compares the text from the OCR device with content relating to transactions that is stored in an account provider data storage 154. The comparison unit may identify matches between the text extracted from the image of a transaction receipt and the transaction data in the account provider data storage 154. Those matches may then be used to verify that the user utilizing client device 120 actually purchased the transaction items contained on the transaction receipt to in turn verify the authenticity of the transaction receipt itself. As such, the OCR image may be utilized to match a transaction receipt to a particular transaction record for a user stored on account provider system 150. This may include identifying additional information about the transaction, such as the geo-location tied to the transaction and/or a timestamp of the transaction.

For example, a method for extracting content from transaction receipt may include utilizing OCR software which may extract raw text from the transaction receipt. The raw text may then be searched using a regex to find identifying information that may match information associated with the transaction stored in account provider system data storage 154. For example, the identifying information may include SKU level inventory information, and specific details of the individual transaction items, such as the geo-location tied to the transaction, a timestamp of the transaction, and/or last four digits of the credit card used to complete the transaction.

If a match is found, the transaction receipt can then verify that the associated user actually made the purchase. Knowing the information about the transaction based on the enhanced transaction receipt data provides high confidence in verifying the transaction by the user when requesting a price match.

Comparisons can be made with the text extracted during the first pass in order to identify fields and the content of the fields, so as to confidently classify the extracted text as belonging to a certain field and having a certain format.

Once the content of the transaction receipt is identified, the relevant content may be forwarded to account provider system 150 to find a price change.

The raw extracted text may also be parsed to classify the other text as belonging to a certain field. Predictive methods can be used to identify what text belongs in what field based on general properties of text in certain fields, such as dates, monetary mounts, addresses, names, etc. Numbers found on the statement can also be classified based on heir location with respect to certain keywords that may be found on the statement, such as "Credit Card No.," "Merchant Name," "Merchant Location," "Total Balance," "Date," "Time," and so on.

Upon extracting the enhanced transaction information from the transaction receipt, a unique key may be generated by authentication server 153. The key may include a token that may be utilized to determine whether the price matching should be authorized. For example, the enhanced transaction information may include the timestamp of the transaction. This unique key may be matched to a transaction record stored in data storage 154, and as such may be utilized to generate a reliability score for the OCRed image. In another embodiment, user credentials associated with a mobile application, such as client application 124, and user information stored on a user's mobile wallet may also be utilized to match the generated key. In another embodiment, for online purchases, a browser plugin may be utilized to access data from a checkout screen on a client device. This data may be similarly utilized to create a unique key, for example the key may be created from the confirmation number of the transaction order.

The generated unique key may be transmitted to price monitoring server 156 to determine whether to authorize price matching. If the unique key is matched to the transaction record, the system may authorize price matching. This generation of a unique key could eliminate the need for storing sensitive customer information, such as a credit card number and a cv code, for example, within a secure element on a client device. In effect, the keys could serve as single-use, or limited-use credit card numbers.

Price monitoring server 156 may be operated by a third party system or may be integrated with account provider system 150.

Account provider system 150 may include modules, systems, and interfaces to send and/or receive data for use in other modules, such as communication interface 159. A communication interface 159 may include various hardware and software components, such as, for example, a repeater, a microwave antenna, a cellular tower, or another network access device capable of providing connectivity between network mediums. The communication interface 159 may also contain various software and/or hardware components to enable communication over a network 110. For example, communication interface 159 may be capable of sending or receiving signals via network 110. Moreover, communication interface 159 may provide connectivity to one or more wired networks and may be capable of receiving signals on one medium such as a wired network and transmitting the received signals on a second medium such as a wireless network.

Figure 2:
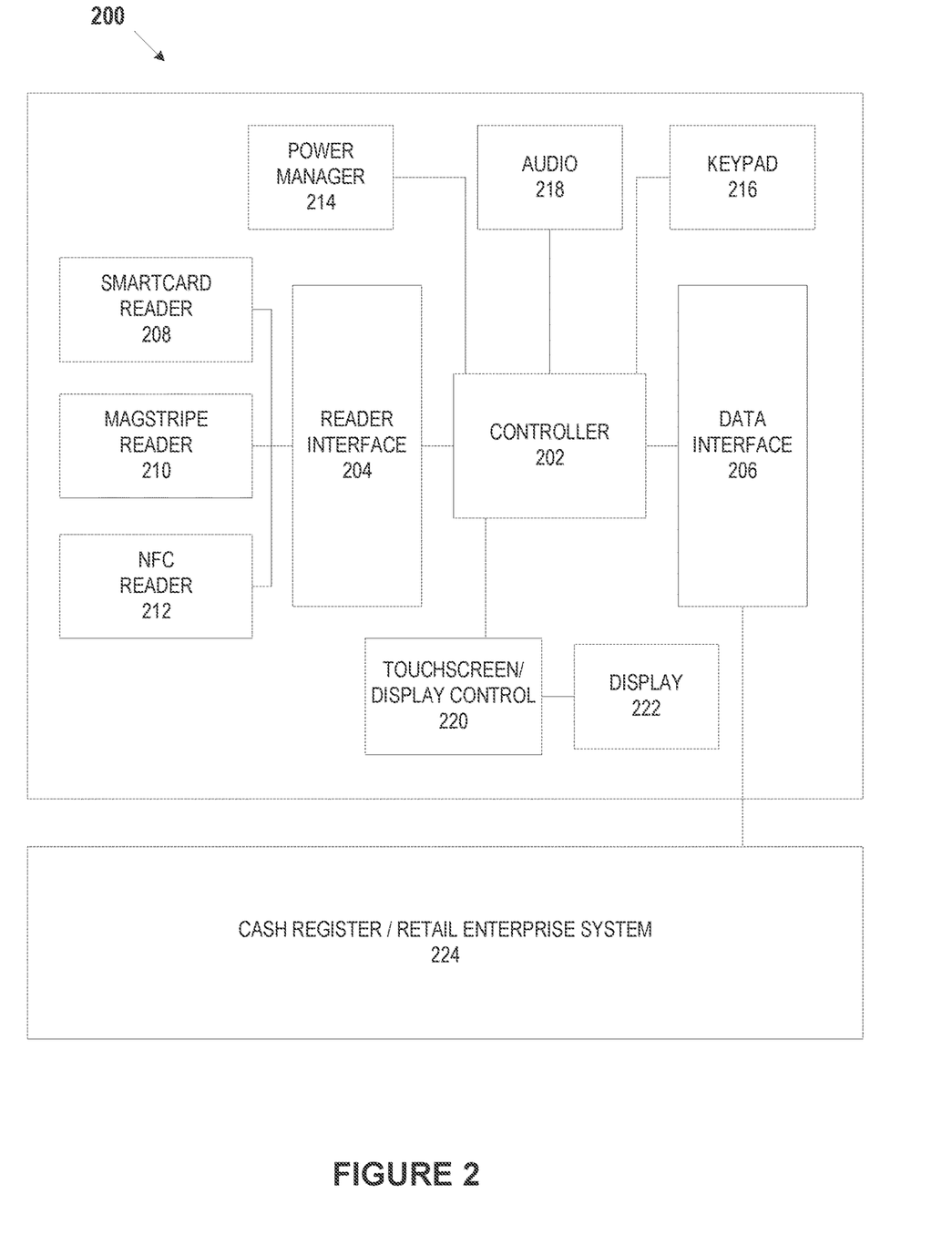
FIG. 2 depicts an example system including a point-of-sale (PoS) device, according to embodiments of the disclosure.

Merchant system 130 may include, among other components, a Point-of-Sale (PoS) device. As illustrated in FIG. 2, a PoS device may include a variety of readers to read transaction data associated with a transaction taking place with a merchant. PoS device may include various hardware and/or software components required to conduct and process transaction. Merchant system 130 may also include data storage 136 to store transaction data and/or approval of charges between a cardholder and the merchant associated with the PoS device.

A PoS system may include a terminal 132 and a payment gateway 134. Terminal 132 and payment gateway 134 may comprise the physical or virtual device(s) used by merchant system 130 to communicate information to a remote processor of the merchant system. Terminal 132 may include an EMV™ card reader to interact with a dynamic transaction card. Terminal 132 may include a smart payment terminal, such as those provided by Square™, Poynt™, and Clover™. Terminal 132 may function to provide standard compliant payment processing, and may act as a merchant data aggregator by enabling access to merchant-level information, which may be stored in data storage 136. Terminal 132 may function to collect payment information associated with orders or transactions for the merchant, and may additionally function as a platform through which third party applications, such as account provider system 150, may access payment and transaction information. Terminal 132 enables application interaction with transaction data generated by traditional payment terminals, and may also interact with a remote system which may function to store merchant information.

Terminal 132 may function to generate or otherwise process order information. Order information may include transaction information, cart or product information (e.g., product identifier, number of each product, etc.), customer identifiers, merchant identifiers, employee identifiers, order status (e.g., completed, open, paid but not picked up, etc.), or any other suitable order information. Transaction information may include a transaction identifier, transaction amount, merchant information, customer identifier, payment type, terminal identifier, and/or any other suitable information about the transaction. The transaction identifier may be universally unique, unique to the merchant, unique to the customer identifier, generic, or be defined in any other suitable manner. Merchant system 130 may access and download transaction and order data, and ma control which applications have access to particular pieces of data.

Terminal 132 may include communications systems that may function to communicate data with external systems, determine inventory based on inventory signals, connect to peripheral devices (e.g., printers, scanners, registers), and user devices. The communications systems may be wired or wireless. The wireless communications systems may be WiFi, cellular, satellite, RF, IR, Bluetooth™, BLE, NFC or any other suitable module.

In various embodiments, payment gateway 134 may be an e-commerce application service provider service that authorizes payments for merchants. As such, payment gateway 134 may be a virtual equivalent of a PoS terminal and interface with, for example, a billing system of merchant system 130 and pass data to a remote processor of the merchant system.

Although not shown, merchant system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Account provider system 150 may include systems associated with, for example, a banking service company such as Capital One®, Bank of America®, Citibank®, Wells Fargo®, Sun Trust™, various community banks, and the like, as well as a number of other financial institutions such as Visa®, MasterCard®, and American Express® that issue credit and/or debit cards, for example, as transaction cards. Account provider system 150 may include and/or be connected to one or more computer systems and networks to process transactions. Account provider system 150 may include systems associated with financial institutions that issue transaction cards, including dynamic transaction cards, and maintains a contract with cardholders for repayment. In various embodiments, an account provider system 150 may issue credit, debit, and/or stored value account. Account provider system 150 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Merchant system 130 may include modules, systems, and interfaces to send and/or receive data for use in other modules, such as communication interface 138. A communication interface 138 may include various hardware and software components, such as, for example, a repeater, a microwave antenna, a cellular tower, or another network access device capable of providing connectivity between network mediums. The communication interface 138 may also contain various software and/or hardware components to enable communication over a network 110. For example, communication interface 138 may be capable of sending or receiving signals via network 110. Moreover, communication interface 138 may provide connectivity to one or more wired networks and may be capable of receiving signals on one medium such as a wired network and transmitting the received signals on a second medium such as a wireless network.

Account provider system 150 may include a transaction system 152 and data storage 154. Transaction system 134 may include various hardware and software components to communicate between a merchant, acquisition system, account provider system, and/or a user device to process a transaction, such as a user purchase. Data storage 154 may store data associated with an account (e.g., card number, account type, account balance, account limits, budget data, recent transactions, pairing data such as time, date, and location of pairing with a mobile device, and the like) and account holder data (e.g., account holder name, address, phone number(s), email address, demographic data, and the like).

Referring to FIG. 2, an example PoS device 200 is shown. PoS device 200 may include a controller 202, a reader interface 204, a data interface 206, a smartcard and/or EMV™ chip reader 208, a magnetic stripe reader 210, a near-field communications (NFC) reader 212, a power manager 214, a keypad 216, an audio interface 218, a touchscreen/display controller 220, and a display 222. Also, PoS device 200 may be coupled with, integrated into or otherwise connected with a cash register/retail enterprise system 224.

In various embodiments, Controller 202 may be any controller or processor capable of controlling the operations of PoS device 200. For example, controller 202 may be an Intel® 2nd Generation Core™ i3 or i5 or Pentium™ G850 processor or the like. Controller 202 also may be a controller included in a personal computer, smartphone device, tablet PC or the like.

Reader interface 204 may provide an interface between the various reader devices associated with PoS device 200 and PoS device 200. For example, reader interface 204 may provide an interface between smartcard and/or EMV™ chip reader 208, magnetic stripe reader 210, NFC reader 212 and controller 202. In various embodiments, reader interface 204 may be a wired interface such as a USB, RS232 or RS485 interface and the like. Reader interface 204 also may be a wireless interface and implement technologies such as Bluetooth™, the 802.11(x) wireless specifications and the like. Reader interface 204 may enable communication of information read by the various reader devices from the various reader devices to PoS device 200 to enable transactions. For example, reader interface 204 may enable communication of a credit or debit card number read by a reader device from that device to PoS device 200. In various embodiments, reader interface 204 may interface between PoS device 200 and other devices that do not necessarily "read" information but instead receive information from other devices.

Data interface 206 may allow PoS device 200 to pass communicate data throughout PoS device and with other devices including, for example, cash register/retail enterprise system 224. Data interface 206 may enable PoS device 200 to integrate with various customer resource management (CRM) and/or enterprise resource management (ERP) systems. Data interface 206 may include hardware, firmware and software that make aspects of data interface 206 a wired interface. Data interface 206 also may include hardware, firmware and software that make aspects of data interface 206 a wireless interface. In various embodiments, data interface 206 also enables communication between PoS device other devices.

Smartcard and/or EMV™ chip reader 208 may be any electronic data input device that reads data from a dynamic transaction card and/or EMV™ processor. Smartcard and/or EMV chip reader 208 may be capable of supplying an integrated circuit (e.g., EMV™ processor) on the dynamic transaction card with electricity and communicating with the dynamic transaction card via protocols, thereby enabling read and write functions. In various embodiments, smartcard and/or EMV™ chip reader 208 may enable reading from contact or contactless transaction cards. Smartcard and/or EMV™ chip reader 208 also may communicate using standard protocols including ISO/IEC 7816, ISO/IEC 14443 and/or the like or proprietary protocols.

Magnetic stripe reader 210 may be any electronic data input device that reads data from a magnetic stripe on a credit or debit card, for example. In various embodiments, magnetic stripe reader 210 may include a magnetic reading head capable of reading information from a magnetic stripe. Magnetic stripe reader 210 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 212 may be any electronic data input device that reads data from a NFC device. In an example embodiment, NFC reader 212 may enable Industry Standard NFC Payment Transmission. For example, the NFC reader 212 may communicate with a NFC enabled device to enable two loop antennas to form an air-core transformer when placed near one another by using magnetic induction. NFC reader 212 may operate at 13.56 MHz or any other acceptable frequency. Also, NFC reader 212 may enable a passive communication mode, where an initiator device provides a carrier field, permitting answers by the target device via modulation of existing fields. Additionally, NFC reader 212 also may enable an active communication mode by allowing alternate field generation by the initiator and target devices.

In various embodiments, NFC reader 212 may deactivate an RF field while awaiting data. NFC reader 212 may receive communications containing Miller-type coding with varying modulations, including 100% modulation. NFC reader 212 also may receive communications containing Manchester coding with varying modulations, including a modulation ratio of approximately 10%, for example. Additionally, NFC reader 212 may be capable of receiving and transmitting data at the same time, as well as checking for potential collisions when the transmitted signal and received signal frequencies differ.

NFC reader 212 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 212 may be able to utilize transmission protocols and methods that are developed in the future using other frequencies or modes of transmission. NFC reader 212 also may be backwards-compatible with existing payment techniques, such as, for example RFID. Also, NFC reader 212 may support transmission requirements to meet new and evolving payment standards including internet based transmission triggered by NFC. In various embodiments, NFC reader 212 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 214 may be any microcontroller or integrated circuit that governs power functions of PoS device 200. Power manager 214 may include, for example, firmware, software, memory, a CPU, a CPU, input/output functions, timers to measure intervals of time, as well as analog to digital converters to measure the voltages of the main In this manner, when a dynamic transaction card is exposed to light, the LED display of the dynamic transaction card may detect light, and transmit the light signals from the LED to the microprocessor/microcontroller, such as microprocessor/microcontroller and/or a bootloader, such as bootloader to activate the dynamic transaction card.

In various embodiments, Power manager 214 remains active even when PoS device 200 is completely shut down, unused, and/or powered by the backup energy storage component. Power manager 214 may be responsible for coordinating many functions, including, for example, monitoring power connections and energy storage component charges, charging batteries when necessary, controlling power to other integrated circuits within PoS device 200 and/or other peripherals and/or readers, shutting down unnecessary system components when they are left idle, controlling sleep and power functions (on and off), managing the interface for built-in keypad and trackpads, and/or regulating a real-time clock (RTC).

Keypad 216 may any input device that includes a set of buttons arranged, for example, in a block or pad and may bear digits, symbols and/or alphabetical letters. Keypad 216 may be a hardware-based or mechanical-type keypad and/or implemented in software and displayed on, for example, a screen or touch screen to form a keypad. Keypad 216 may receive input from a user that pushed or otherwise activates one or more buttons on keypad 216 to provide input.

Audio interface 218 may be any device capable of providing audio signals from PoS device 200. For example, audio interface may be a speaker or speakers that may produce audio signals. In various embodiments, audio interface 218 may be integrated within PoS device 200. Audio interface 218 also may include components that are external to PoS device 200.

Touchscreen/display control 220 may be any device or controller that controls an electronic visual display. Touchscreen/display control 220 may allow a user to interact with PoS device 200 through simple or multi-touch gestures by touching a screen or display (e.g., display 222). Touchscreen/display control 220 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 220 may receive inputs from the touchscreen and process the received inputs. Touchscreen/display control 220 also may control the display on PoS device 200, thereby providing the graphical user interface on a display to a user of PoS device 200.

Display 222 may be any display suitable for a PoS device. For example, display 222 may be a TFT, LCD, LED or other display. Display 222 also may be a touchscreen display that for example allows a user to interact with PoS device 200 through simple or multi-touch gestures by touching a screen or display (e.g., display 222). Display 222 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 222 may receive inputs from control gestures provided by a user. Display 222 also may display images, thereby providing the graphical user interface to a user of PoS device 200.

Cash register/retail enterprise system 224 may include any device or devices that cooperate with PoS device 200 to process transactions. Cash register/retail enterprise system 224 may be coupled with other components of PoS device 200 via, for example, a data interface (e.g., data interface 206). Cash register/retail enterprise system 224 also may be integrated into PoS device 200.

In various embodiments, cash register/retail enterprise system 224 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 224 may comprise a retail enterprise system and/or a customer relationship management system. Retail enterprise system 224 may enable retain enterprises to manage operations and performance across a retail operation. Retail enterprise system 224 may be a stand-alone application in, for example, individual stores, or may be interconnected via a network. Retail enterprise system 224 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 224 also may include inventory control and tracking capabilities, reporting tools, customer management capabilities, employee management tools, and may integrate with other accounting software.

In various embodiments cash register/retail enterprise system 224 may be a hospitality PoS. In such embodiments, retail enterprise system 224 may include hospitality PoS software (e.g., Aloha PoS Restaurant software from NCR®, Micros® RES and Symphony software and the like), hospitality management software, and other hardware and software to facilitate hospitality operations.

Figure 3:
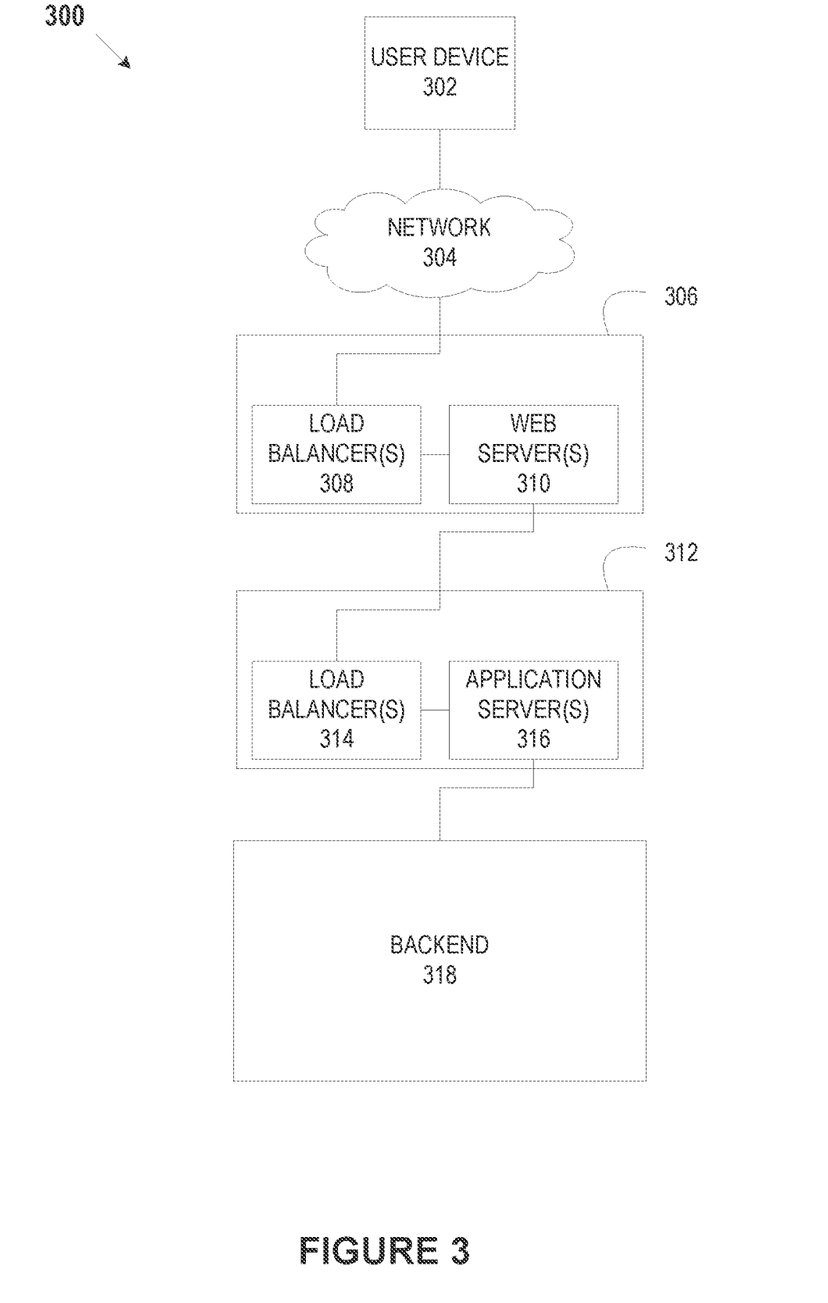
FIG. 3 depicts an example system and device to a generate a notification of a price change for a transaction and facilitate an associated price adjustment based on electronic image capture of a paper receipt for the transaction, according to embodiments of the disclosure.

Referring to FIG. 3, system 300 may include a system and device to generate a notification of a price change for a transaction and facilitating an associated price adjustment based on electronic image capture of a paper receipt for the transaction. For example, system 300 may include a user device 302, which may be similar to a mobile device such as client device 120, a network 304, which may be similar to network 110, a front-end controlled domain 306, a back-end controlled domain 312, and a backend system 318. Front-end controlled domain 306 may include one or more load balancers 308 and one or more web servers 310. Back-end controlled domain 312 may include one or more load balancers 314 and one or more application servers 316.

User device 302 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 300 may execute one or more software applications to enable, for example, network communications.

User device 302 may be an iPhone, iPod, iPad, and/or Apple Watch from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

User device 302 may also be a network-enabled computer. As referred to herein, a network-enabled computer may be, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device.

Network 304 may be one or more of a wireless network, a wired network, or any combination of a wireless network and a wired network. For example, network 304 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 304 may include, without limitation, telephone lines, fiber optics, IEEE Ethernet 902.3, a wide area network (WAN), a local area network (LAN) or a global network such as the Internet. Also, network 304 may support an Internet network, a wireless communication network, a cellular network, or the like, or any combination thereof. Network 404 may further include one network, or any number of example types of networks mentioned above, operating as a stand-alone network or in cooperation with each other. Network 304 may utilize one or more protocols of one or more network elements to which they are communicatively couples. Network 304 may translate to or from other protocols to one or more protocols of network devices. Although network 304 is depicted as a single network, it should be appreciated that according to one or more embodiments, network 304 may comprise a plurality of interconnected networks, such as, for example, the Internet, a service provider's network, a cable television network, corporate networks, and home networks.

Front-end controlled domain 306 may be implemented to provide security for backend 318. Load balancer(s) 308 may distribute workloads across multiple computing resources, such as, for example computers, a computer cluster, network links, central processing units or disk drives. In various embodiments, load balancer(s) 310 may distribute workloads across, for example, web server(s) 316 and/or backend 318 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 308 may include software that monitoring the port where external clients, such as, for example, user device 302, connect to access various services of a financial institution, for example. Load balancer(s) 308 may forward requests to one of the application servers 316 and/or backend 318 servers, which may then reply to load balancer 308. This may allow load balancer(s) 308 to reply to user device 302 without user device 302 ever knowing about the internal separation of functions. It also may prevent mobile devices from contacting backend servers directly, which may have security benefits by hiding the structure of the internal network and preventing attacks on backend 318 or unrelated services running on other ports, for example.

A variety of scheduling algorithms may be used by load balancer(s) 308 to determine which backend server to send a request to. Simple algorithms may include, for example, random choice or round robin. Load balancers 308 also may account for additional factors, such as a server's reported load, recent response times, up/down status (determined by a monitoring poll of some kind), number of active connections, geographic location, capabilities, or how much traffic it has recently been assigned.

Load balancers 308 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 310 may include hardware (e.g., one or more computers) and/or software (e.g., one or more applications) that deliver web content that can be accessed by, for example a client device (e.g., user device 302) through a network (e.g., network 304), such as the Internet. In various examples, web servers, may deliver web pages, relating to, for example, online banking applications and the like, to clients (e.g., user device 302). Web server(s) 310 may use, for example, a hypertext transfer protocol (HTTP/HTTPS or sHTTP) to communicate with user device 302. The web pages delivered to user device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 310 may respond with the content of that resource or an error message if unable to do so. The resource may be, for example a file on stored on backend 318. Web server(s) 310 also may enable or facilitate receiving content from user device 302 so user device 302 may be able to, for example, submit web forms, including uploading of files.

Web server(s) also may support server-side scripting using, for example, Active Server Pages (ASP), PHP, or other scripting languages. Accordingly, the behavior of web server(s) 310 can be scripted in separate files, while the actual server software remains unchanged.

Load balancers 314 may be similar to load balancers 308 as described above.

Application server(s) 316 may include hardware and/or software that is dedicated to the efficient execution of procedures (e.g., programs, routines, scripts) for supporting its applied applications. Application server(s) 316 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 316 may act as a set of components accessible to, for example, a financial institution, or other entity implementing system 400, through an API defined by the platform itself. For Web applications, these components may be performed in, for example, the same running environment as web server(s) 310, and application servers 316 may support the construction of dynamic pages. Application server(s) 316 also may implement services, such as, for example, clustering, fail-over, and load-balancing. In various embodiments, where application server(s) 316 are Java application servers, the web server(s) 316 may behaves like an extended virtual machine for running applications, transparently handling connections to databases associated with backend 318 on one side, and, connections to the Web client (e.g., user device 302) on the other.

Backend 318 may include hardware and/or software that enables the backend services of, for example, a financial institution, merchant, or other entity that maintains a distributed system similar to system 300. For example, backend 318 may include, a system of record, online banking applications, encryption applications, BLE/Bluetooth™ connection platforms, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 318 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), connection information (e.g., public/private key pairs, UUIDs, device identifiers, and the like) and the like. Backend 318 also may be associated with one or more servers that enable the various services provided by system 300. Backend 318 may enable a financial institution to implement various functions associated with reprogramming a transaction card and/or providing data to a transaction card in order to facilitate the connection of a first device to a second device as described herein.

A customer client device 120 may communicate with a merchant system via mobile client application 124. Client device 120 may utilize location-tracking systems and methods, such as GPS, to determine the current location of the customer client device. Upon determining the current location of the customer client device, client application 124 may send the current location to transaction system 152 via network 110.

Upon authorization for price matching, price monitoring server 156 may utilize a web crawler as an item level price tracker to facilitate price matching by searching for a price change of an item identified on a user's transaction receipt through the electronic data extraction. For example, prices for the transaction item may be obtained from web pages accessed by web crawlers and APIs. The web crawler process may automatically browse the web on a defined schedule, and may identify and index merchant sites selling the transaction item, which may include the merchant site where the transaction item was purchase, and may also include other external merchant sites. In an embodiment, a web may be embodied in a script that may parse HTML code of the sites to look for certain attributes associated with merchant sites. Price monitoring server 156 may determine whether a price change has occurred for the purchased item by comparing an original purchase price with a current price of the purchased item based on the determination that the purchased item has not been returned.

If price monitoring server 156 identifies that the price of a previously purchased transaction item has changed, price adjustment server 158 may automatically generate and transmit a notification to the user via an email, SMS message, etc., indicating the price change for the purchased item, based on the determination that the original price and the purchase price are different. The notification may be transmitted to client device 120. This generated notification may also indicate whether the price adjustment must be completed at a merchant location, or whether it can be completed electronically from the user's client device. Price adjustment server 158 may also automatically generate and transmit an email to the customer service department of the merchant from which the transaction item was purchased, requesting a price adjustment that is credited back to the payment instrument used in making the transaction. The price adjustment amount may be the difference between the original purchase price and the current transaction price. The email may include the picture of the paper receipt captured by client device 120 and processed by image capture system 126.

Transaction server 152 may receive acceptance of the price adjustment from merchant system 130, and in response, transaction server 152 may credit the customer account the price adjustment amount. In response, price adjustment server 158 may generate and transmit via communication interface 159 an electronic notification to merchant system 130 identifying the price adjustment.

In another embodiment, client device 120 may include a mobile device that may utilize location-tracking systems and methods, such as geo-fencing technologies, to determine the current location of a customer mobile device. Client application 124 may utilize this determined location to automatically, in real time, compare the current location of the customer mobile device to merchant locations identified by client application 124 for which price matching has been identified. If price monitoring server 156 determines that the location of the customer mobile device matches a merchant location for which price matching has been identified, client application 124 may transmit the current location of the customer mobile device to price adjustment server 158, which may, in real time, transmit a notification to client device 120 indicating that the customer has a price matched credit at the current merchant location.

Additionally, price monitoring server 156 may transmit a SKU number and an original purchase price of the purchased item to merchant system 130 to initiate the price matching processing, via communication interface 159. Merchant system 130 may use the SKU number to identify the purchased item and to search for the current price of the purchased item and may compare the original purchase price with the current price of the purchased item to determine whether there has been a price change. If merchant system 130 determines that the original purchase price and the current purchase price are different, it may generate and transmit via communication interface 138, an electronic notification to customer client device 120 identifying the price change, where the price adjustment amount is the difference between the original transaction price and the current transaction price.

The price matching processing may also be automatically initiated by price monitoring server 156 at a set time interval. For example, once a week, price monitoring server 156 may transmit a SKU number and an original purchase price of the purchased item to merchant system 130 to initiate the price matching processing, via communication interface 159. Merchant system 130 may use the SKU number to identify the purchased product and to search for the current price of the purchased item, and may transmit the current price to price monitoring server 153 for price matching processing. Additionally, the price matching processing may also be initiated manually by a customer when a customer transmits a request utilizing client application 124 on client device 120.

Figure 4:
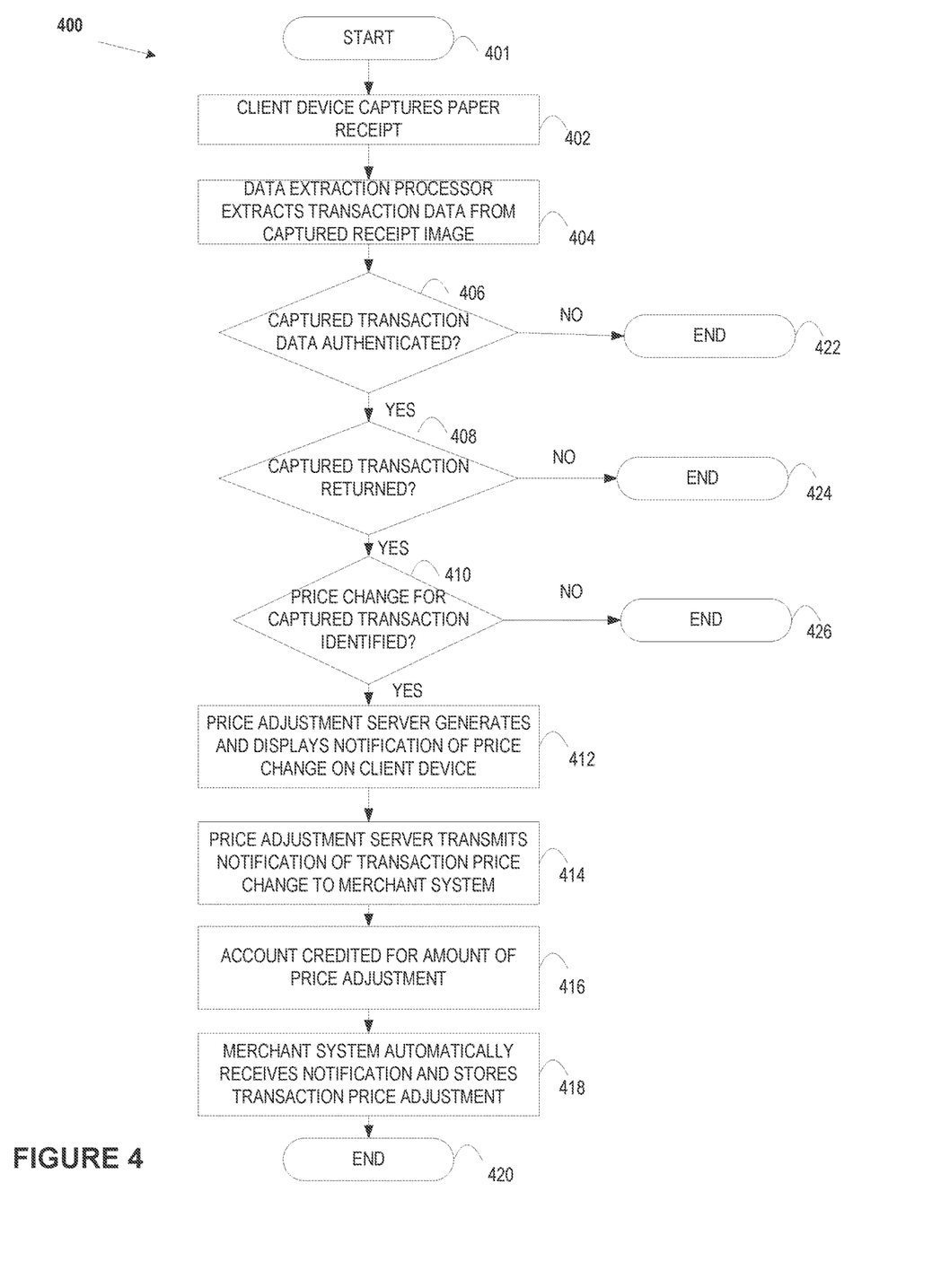
FIG. 4 depicts an example method for generating a notification of a price change for a transaction and facilitating an associated price adjustment based on electronic image capture of a paper receipt for the transaction, according to embodiments of the disclosure.

FIG. 4 illustrates an example method of generating a notification of a price change for a transaction and facilitating an associated price adjustment based on electronic image capture of a paper receipt for the transaction. The process 400 may begin at block 401. A client device 120 may utilize image capture system 126 to capture an image of a paper transaction receipt at block 402. Client device 120 may send the captured electronic image to data extraction processor 140, which may extract transaction data from the captured transaction receipt image at block 404. Data extraction processor 140 may include a comparison unit which compares the text from the electronically captured image of the transaction receipt with content relating to transactions that is stored in an account provider data storage 154. The comparison unit may identify matches between the text extracted from the image of a transaction receipt and the transaction data in the account provider data storage 154. The extracted transaction data may be transmitted to authentication server 153.

At block 406, the captured transaction data may be authenticated using authentication server 153. The electronically captured image may be utilized to match a transaction receipt to a particular transaction record for a user stored on account provider system 150. This may include identifying additional information about the transaction, such as the geo-location tied to the transaction and/or a timestamp of the transaction. The matches may then be used to verify that the user utilizing client device 120 actually purchased the transaction items contained on the transaction receipt to in turn verify the authenticity of the transaction receipt itself. As such, the electronically captured image may be utilized to match a transaction receipt to a particular transaction record for a user stored on account provider system 150. This may include identifying additional information about the transaction, such as the geo-location tied to the transaction and/or a timestamp of the transaction. Authentication server may also receive SKU item level detailed information associated with the transaction from a merchant system, which may be utilized by the authentication server to authentication not only the purchase, but also the price of the transaction.

If the captured transaction data is not authenticated, the process may end at block 422. If the captured transaction data is authenticated, the system may determine whether the item purchased for the identified transaction has been returned at block 408. Price monitoring server 156 may request associated transaction information for the identified transaction from transaction server 152. The requested transaction information may be utilized price monitoring server 156 to assess whether the purchased item has been returned. If the purchase item has been returned, the process may end at block 424 such that the price matching processing is not performed for items that have been returned.

If price monitoring server 156 determines that the purchased item has not been returned, the process may continue at block 408. Price monitoring server 156 may provide a price tracker, which may include a web crawler, to facilitate price matching by searching for a price change of an item identified on a user's transaction receipt through the electronic data extraction. For example, prices for the transaction item may be obtained from web pages accessed by web crawlers and APIs. If price monitoring server 156 does not identify a price change, the process may end at block 426.

At block 412, if a price change is identified, price adjustment server 158 may automatically generate and display on client device 120 a notification of the price change. This notification may include the amount of the change in price and the location of the merchant with the lower price. At block 414, price adjustment server 158 may automatically transmit notification of the price change to a merchant system. This notification may include a request for an electronic credit of the price adjusted amount to the payment instrument used in making the transaction.

At block 416, merchant system 130 may communicate with account provider system 150 to facilitate a price adjustment by crediting the customer account the difference between the price originally payed by the customer and the identified lower price, the price change. The merchant system may automatically receive a notification from account provider system 150 of the price adjustment and may store the adjusted transaction price in data storage 136 at block 418. As such, if the customer were to later return the price adjusted item, the merchant system would be able to pull the adjusted transaction price to credit the customer, rather than crediting the customer for the full original price, for which the customer has already been credited a portion.

The process may end at block 420.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

I claim:

1. A system, comprising:
a transaction server;
a price monitoring server;
a price adjustment server; and
an authentication server;
wherein the authentication server is configured to:
receive first customer transaction data, sent from a data extraction processor that extracts the first customer transaction data from an electronic image of a paper receipt associated with a customer transaction that is captured by an image capture system of a dynamic customer client device,
wherein the first customer transaction data comprises a first transaction identifier associated with the customer transaction;
generate a unique key based on receiving the first customer transaction data;
compare the unique key to a stored transaction record associated with the customer transaction;
responsive to determining the unique key and the stored transaction record match, authenticate the customer transaction; and
wherein the price adjustment server is configured to:
receive a first location of the dynamic customer client device;
determine that the first location matches a second location associated with a merchant location for which price matching has been identified;
responsive to determining the first and second locations match, generate and transmit, via a mobile wallet application, a first electronic notification to the dynamic customer client device identifying a price change for a purchased item, based on a first determination that the purchased item has not been returned, and a second determination that an original purchase price and a current price are different, wherein a price adjustment amount is a difference between the original purchase price and the current price;
generate and transmit, in real-time and via the mobile wallet application, a second electronic notification to the dynamic customer client device indicating that a price adjustment for the price adjustment amount may be completed electronically or at the merchant location;
cause the dynamic customer client device to display, via the mobile wallet application, a first user object configured to facilitate the price adjustment;
receive, from a user of the dynamic customer client device via the mobile wallet application, a first user selection of the first user object, the first user selection indicating a preference to complete the price adjustment; and
in response to receiving the first user selection, automatically transmit a third electronic notification to a merchant system requesting the price adjustment be credited back to an account of the user.

2. The system of claim 1, wherein the image capture system comprises a camera on the dynamic customer client device.

3. The system of claim 1, wherein the image capture system comprises a scanner connected to the dynamic customer client device.

4. The system of claim 1, wherein the data extraction processor comprises an optical character recognition (OCR) device.

5. The system of claim 1, wherein the authentication server is further configured to receive, from the dynamic customer client device, customer information stored on the mobile wallet application of the dynamic customer client device.

6. The system of claim 1, wherein the third electronic notification to the merchant system includes the electronic image.

7. A system, comprising:
one or more processors; and
a memory in communication with the one or more processors and storing instructions that, when executed by the one or more processors, are configured to cause the system to:
receive, from a dynamic customer client device via a mobile wallet application, an authentication request and an electronic image of a paper receipt associated with a customer transaction of a purchased item;
extract a first transaction identifier and an original price from the electronic image;
responsive to extracting the first transaction identifier and the original price, generate a unique key;
compare the unique key to a stored transaction record associated with the customer transaction;
determine whether the unique key and the stored transaction record match; and
responsive to determining the unique key and the stored transaction record match:
determine whether the purchased item has been returned; and
when the purchased item has not been returned:
activate a web crawler to search and find a current price of the purchased item,
determine whether a price change exists between the original price and the current price for the purchased item by comparing the original price to the current price; and
when a price change exists:
receive a first location of the dynamic customer client device;
determine that the first location matches a second location associated with a merchant location for which price matching has been identified;
responsive to determining the first and second locations match, generate and transmit, to the dynamic customer client device via the mobile wallet application, a first electronic notification identifying the price change for the purchased item;
cause the dynamic customer client device to display, via the mobile wallet application, a first user object for facilitating a price adjustment associated with the price change;

receive, from a user of the dynamic customer client device via the mobile wallet application, a first user selection of the first user object, the first user selection indicating a preference to complete the price adjustment; and
automatically transmit, in response to receiving the first user selection, a second electronic notification to a merchant system requesting the price adjustment be credited back to the user.

8. A system, comprising:
one or more processors; and
a memory in communication with the one or more processors and storing instructions that, when executed by the one or more processors, are configured to cause the system to:
receive, from a dynamic transaction card via a mobile wallet application, an electronic image of a paper receipt associated with a customer transaction of a purchased item and associated with a merchant;
extract a first transaction identifier, a store keeping unit (SKU) number, and an original price from the electronic image;
responsive to extracting the first transaction identifier, the SKU number, and the original price, generate a unique key;
compare the unique key to a stored transaction record associated with the customer transaction;
determine whether the unique key and the stored transaction record; and
responsive to determining the unique key and the stored transaction record match:
determine whether the purchased item has been returned; and
when the purchased item has not been returned:
transmit the SKU number and the original price of the purchased item to a merchant system associated with the merchant;
receive from the merchant system a current price of the purchased item;
monitor for a price change between the original price and the current price for the purchased item by comparing the original price to the current price; and
when a price change exists:
receive a first location of the dynamic transaction card;
determine that the first location matches a second location associated with a merchant location for which price matching has been identified;
responsive to determining the first and second locations match, generate and transmit, to the dynamic transaction card via the mobile wallet application, a first electronic notification identifying the price change for the purchased item;
cause the dynamic transaction card to display, via the mobile wallet application, a first user object for facilitating a price adjustment associated with the price change; and
receive, from a user of the dynamic transaction card via the mobile wallet application, a first user selection of the first user object, the first user selection indicating a preference to complete the price adjustment.

9. A system, comprising:
one or more processors; and
a memory in communication with the one or more processors and storing instructions that, when executed by the one or more processors, are configured to cause the system to:
receive, from a dynamic transaction device via a mobile wallet application, an electronic image of a paper receipt associated with a customer transaction of a purchased item and associated with a merchant;
extract a first transaction identifier, a store keeping unit (SKU) number, and an original price from the electronic image;
responsive to extracting the first transaction identifier, the SKU number, and the original price, generate a unique key;
compare the unique key to a stored transaction record associated with the customer transaction;
determine whether the unique key and the stored transaction record match; and
responsive to determining the unique key and the stored transaction record match:
transmit the SKU number and the original price of the purchased item to a merchant system associated with the merchant;
receive from the merchant system a current price of the purchased item;
determine whether a price change exists between the original price and the current price for the purchased item by comparing the original price to the current price; and
when a price change exists:
receive a first location of the dynamic transaction device;
determine that the first location matches a second location associated with a merchant location for which price matching has been identified;
responsive to determining the first and second locations match, generate and transmit, to the dynamic transaction device via the mobile wallet application, a first electronic notification identifying the price change for the purchased item;
cause the dynamic transaction device to display, via the mobile wallet application, a first user object configured to facilitate a price adjustment associated with the price change; and
receive, from a user of the dynamic transaction device via the mobile wallet application, a first user selection of the first user object.

10. The system of claim 9, wherein the memory stores further instructions that when executed by the one or more processors, are further configured to cause the system to:
prior to transmitting the SKU number and the original price of the purchased item to the merchant system:
determine whether the purchased item has been returned; and
when the purchased item has not been returned, transmit the SKU number and the original price of the purchased item to the merchant system.

11. The system of claim 9, wherein the memory stores further instructions that when executed by the one or more processors, are further configured to cause the system to:
receive a request to perform price match processing.

12. The system of claim 9, wherein the first electronic notification is transmitted to the dynamic transaction device via email or SMS message.

13. The system of claim 1, wherein the transaction server is configured to credit a price change amount to a payment instrument used to purchase the purchased item.

14. The system of claim 8, wherein the memory stores further instructions that when executed by the one or more processors, are further configured to cause the system to:
responsive to determining that the price change exists, transmit a second electronic notification to the merchant system associated with the merchant, the second electronic notification comprising a request for an electronic credit equal to the price change.

15. The system of claim 9, wherein the memory stores further instructions that when executed by the one or more processors, are further configured to cause the system to:
responsive to determining that the price change exists, transmit a second electronic notification to the merchant system associated the merchant, the second electronic notification comprising a request for an electronic credit equal to the price change.

16. The system of claim 7, wherein the first electronic notification is transmitted to the dynamic customer client device via email or SMS message.

17. The system of claim 8, wherein the first electronic notification is transmitted to the dynamic transaction card via email or SMS message.

18. The system of claim 7, wherein the memory stores further instructions that when executed by the one or more processors, are further configured to cause the system to:
generate a unique key associated with the extracted first transaction identifier;
compare the generated unique key to a pre-stored key associated with the customer transaction; and
responsive to determining the generated unique key and the pre-stored key match, authenticate the customer transaction.

19. The system of claim 18, wherein the memory stores further instructions that when executed by the one or more processors, are further configured to cause the system to:
responsive to determining the generated unique key and the pre-stored key match, generate a reliability score associated with the electronic image.

20. The system of claim 8, wherein the instructions are further configured to cause the system to automatically query the merchant system at a predefined time interval.

21. The system of claim 20, wherein the predefined time interval is once per week.

22. The system of claim 1, wherein the data extraction processor conducts a regular expression (regex) search of the first customer transaction data after extracting the first customer transaction data.

23. The system of claim 1, wherein the unique key comprises a token.

* * * * *